US011017169B2

(12) United States Patent
Ganesalingam

(10) Patent No.: US 11,017,169 B2
(45) Date of Patent: May 25, 2021

(54) METHOD FOR SUGGESTING CANDIDATE WORDS AS REPLACEMENTS FOR AN INPUT STRING RECEIVED AT AN ELECTRONIC DEVICE

(71) Applicant: What3words Limited, London (GB)

(72) Inventor: Mohan Ganesalingam, Cambridge (GB)

(73) Assignee: What3words Limited, London (GB)

( * ) Notice: Subject to any disclaimer, the term of this patent is extended or adjusted under 35 U.S.C. 154(b) by 0 days.

(21) Appl. No.: 15/542,014

(22) PCT Filed: Jan. 2, 2016

(86) PCT No.: PCT/EP2016/050002
§ 371 (c)(1),
(2) Date: Jul. 6, 2017

(87) PCT Pub. No.: WO2016/110455
PCT Pub. Date: Jul. 14, 2016

(65) Prior Publication Data
US 2017/0364502 A1 Dec. 21, 2017

(30) Foreign Application Priority Data

Jan. 6, 2015 (GB) ...................................... 1500104

(51) Int. Cl.
*G06F 17/27* (2006.01)
*G06F 40/274* (2020.01)
*G06F 40/232* (2020.01)

(52) U.S. Cl.
CPC .......... *G06F 40/274* (2020.01); *G06F 40/232* (2020.01)

(58) Field of Classification Search
CPC ............ G06F 17/3097; G06F 17/3053; G06F 17/273; G06F 17/30554; G06F 17/30864;
(Continued)

(56) References Cited

U.S. PATENT DOCUMENTS 7,584,173 B2 9/2009 Bax et al.
9,235,654 B1 * 1/2016 Gupta ................. G06F 17/3097
(Continued)

FOREIGN PATENT DOCUMENTS

WO       0057291 A1    9/2000
WO    2014170646 A1   10/2014

OTHER PUBLICATIONS

K. Audhkhasi and A. Verma, "Keyword Search using Modified Minimum Edit Distance Measure," 2007 IEEE International Conference on Acoustics, Speech and Signal Processing—ICASSP '07, Honolulu, HI, 2007, p. IV-929-IV-932.doi: 10.1109/ICASSP.2007.367223 (Year: 2007).*

(Continued)

*Primary Examiner* — Michael Ortiz-Sanchez
(74) *Attorney, Agent, or Firm* — Gable Gotwals

(57) ABSTRACT

Provided is a computer implemented method for suggesting one or more candidate words from a list of words based on an input string received at an electronic device. Preferably, the list of words comprises an ordered list of words. The method comprises a first step of providing an array in memory for receiving edit distance values between initial substrings of the input string and initial substrings of each word in a set of some or all of the words in the list of words. The method includes applying an edit distance algorithm comparing a selected word to a received input string in order to obtain the aforementioned edit distance values. The selected word may comprise an empty string of no characters. The method includes determining for one or more words of the set of words a number of characters K by which it overlaps with a prefix of a previously considered word and retaining edit distance values in said memory array for said word being considered using some or all of the edit distance values for the K prefix characters of the previously considered word. From the edit distance values, it is possible to (Continued)

identify one or more candidate words from the word list as a replacement for the received input string in a fast and efficient manner.

22 Claims, 3 Drawing Sheets

(58) Field of Classification Search
CPC ........... G06F 17/3064; G06F 17/30657; G06F 17/30424; G06F 17/2785; G06F 17/2795; G06F 17/30; G06F 17/30286; G06F 17/30386; G06F 3/0237; G06F 17/30687; G06F 3/04895; G06F 17/21; G06F 17/2735; G06F 17/241; G06F 17/2715; G06F 17/30442; G06F 17/30654; G06F 17/30672; G06F 17/30684; G06F 17/30737; G06F 17/30401; G06F 17/30539; G06F 17/30976; G06F 21/31; G06F 21/46; G06F 17/276; G06F 17/277; G06F 17/3061; G06F 17/30663; G06F 21/30; G06F 21/51; G06F 2221/2119; G06F 3/04886; G06K 9/723; G10L 2015/081; Y10S 707/99934
See application file for complete search history.

(56) References Cited

U.S. PATENT DOCUMENTS

| | | | |
|---|---|---|---|
| 2004/0220920 A1 | 11/2004 | Bax et al. | |
| 2008/0147637 A1* | 6/2008 | Li | G06F 17/30672 |
| 2008/0167858 A1* | 7/2008 | Christie | G06F 3/0237 704/10 |
| 2009/0174667 A1* | 7/2009 | Kocienda | G06F 3/0237 345/169 |
| 2013/0226563 A1* | 8/2013 | Hirate | G06F 17/2795 704/9 |
| 2014/0067371 A1* | 3/2014 | Liensberger | G06F 17/24 704/9 |
| 2015/0149482 A1* | 5/2015 | Finkelstein | G06F 17/30672 707/748 |
| 2015/0154316 A1* | 6/2015 | Lightner | G06F 17/30312 707/723 |
| 2016/0373456 A1* | 12/2016 | Vermeulen | G06F 17/30675 |

OTHER PUBLICATIONS

Kukich K, "Techniques for Automatically Correcting Words in Text", ACM Computing Surveys, vol. 24, No. 4, Dec. 1992 pp. 378-439, ACM, New York.

Wagner, Robert A. et al., "The String-to-String Correction Problem", Journal of the Association for Computing Machinery, vol. 21, No. 1, Jan. 1974, pp. 168-173, ACM, New York.

Jensen II, James M.,"Damerau-Levenshtein Edit Distance Explained", Computing in the Age of Scarcity [Defunct], Apr. 7, 2013, http://scarcitycomputing.blogspot.com/2013/04/damerau-lavenshtein-edit-distance.html.

* cited by examiner

Figure 4b

K=0, so K+1=1
First k+1 rows (shaded) are already correct

|   | a | b | a | n | d | e | n |   |
|---|---|---|---|---|---|---|---|---|
|   | 0 | 1 | 2 | 3 | 4 | 5 | 6 | 7 | ? |
| a | 1 | 0 | 1 | 2 | 3 | 4 | 5 | 6 | ? |
| b | 2 | 1 | 0 | 1 | 2 | 3 | 4 | 5 | ? |
| a | 3 | 2 | 1 | 0 | 1 | 2 | 3 | 4 | ? |
| c | 4 | 3 | 2 | 1 | 1 | 2 | 3 | 4 | ? |
| u | 5 | 4 | 3 | 2 | 2 | 2 | 3 | 4 | ? |
| s | 6 | 5 | 4 | 3 | 3 | 3 | 3 | 4 | ? |
|   | ? | ? | ? | ? | ? | ? | ? | ? | ? |
|   | ? | ? | ? | ? | ? | ? | ? | ? | ? |
|   | ? | ? | ? | ? | ? | ? | ? | ? | ? |

} Remaining rows need to be computed

Figure 4c

K=3 (as 'aba' overlaps), so K+1=4

|   | a | b | a | n | d | e | n |   |
|---|---|---|---|---|---|---|---|---|
|   | 0 | 1 | 2 | 3 | 4 | 5 | 6 | 7 | ? |
| a | 1 | 0 | 1 | 2 | 3 | 4 | 5 | 6 | ? |
| b | 2 | 1 | 0 | 1 | 2 | 3 | 4 | 5 | ? |
| a | 3 | 2 | 1 | 0 | 1 | 2 | 3 | 4 | ? |
| n | 4 | 3 | 2 | 1 | 0 | 1 | 2 | 3 | ? |
| d | 5 | 4 | 3 | 2 | 1 | 0 | 1 | 2 | ? |
| o | 6 | 5 | 4 | 3 | 2 | 1 | 1 | 2 | ? |
| n | 7 | 6 | 5 | 4 | 3 | 2 | 2 | 1 | ? |
|   | ? | ? | ? | ? | ? | ? | ? | ? | ? |
|   | ? | ? | ? | ? | ? | ? | ? | ? | ? |

} First K+3 rows (shaded, corresponding to 'aba') are already correct

} Remaining rows (corresponding to 'ndon') need to be computed

METHOD FOR SUGGESTING CANDIDATE WORDS AS REPLACEMENTS FOR AN INPUT STRING RECEIVED AT AN ELECTRONIC DEVICE

CROSS-REFERENCE TO RELATED APPLICATIONS

This United States application is the National Phase of PCT Application No. PCT/EP2016/050002 filed 2 Jan. 2016, which claims priority to British Patent Application No. 1500104.3 filed 6 Jan. 2015, each of which is incorporated herein by reference.

FIELD OF THE INVENTION

The invention relates to a computer implemented method for suggesting candidate words as possible replacements for an input string received at an electronic device.

BACKGROUND OF THE INVENTION

There are many situations in which a user may mistype a word or other input datum when using an electronic device adapted to receive user input. Some devices employ predictive text systems in an effort to correct or suggest corrections to the text a user is inputting, but predictive text systems have many limitations. In other cases, a user may be inputting something other than, or in addition to, text and the predictive text system may not then be entirely relevant. There remains therefore considerable scope for providing systems with which the user is interacting the ability to determine possible candidates for replacement or correction of what the user may have inputted.

The applicant's International (PCT) patent application number PCT/GB2014/051152 filed on 14 Apr. 2014 (applicant's prior disclosed system) discloses a method of producing a location identifier. The method comprises obtaining the geographical coordinates of a location and converting the geographical coordinates into a unique group of words. The plurality of words is provided as a memorable location identifier. In a converse manner, it is possible to identify the geographical coordinates of a location from its associated unique group of words.

A problem may arise, however, in that users may mistype and/or misremember the word based location identifier, particularly if this is being inputted sometime after receipt, resulting in their possibly receiving an incorrect resolution of a geographical location or not receiving a location output at all as a result of an irresolvable word based location identifier input, i.e. a word based location identifier which is not recognized as an acceptable input. This problem can be mitigated to some degree within a user interface by, for example, highlighting which country or, if applicable, which city a resolved geographical location is in or near to such that the user can judge whether or not it is a correct or anticipated output thereby making it apparent to the user that an error may have occurred.

There are considerable technical difficulties in identifying an error and suggesting possible candidates for the correct three word sequence for a location. These difficulties include, but are not limited to:

(i) The required response time must be short to be user effective, but, in the applicant's prior disclosed system, there are in the order of 57 trillion possible three word combinations the user might have meant, and, even on modern desktop personal computers, no procedure which scans these one at a time is feasible, even less so on handheld or mobile electronic devices.

(ii) When considering a single alternative, one needs to construct a measure of its closeness to the received original input character string or parts of such string. As this procedure will be called many times, i.e. once for each location the user might have intended, it again needs to be computationally efficient. Often some part, or the entirety, of this process involves comparing the similarity of the actual input to a dictionary containing a large number of acceptable inputs, in determining which of those acceptable inputs are close to or closest to the actual input, and possibly ranking or scoring said acceptable inputs in terms of their closeness to the actual input.

(iii) The method needs to adapted to operate on mobile or handheld electronic devices such as smart phones or tablet computers or the like, where memory is often limited and thus the method needs to utilize as little memory as possible.

OBJECTS OF THE INVENTION

An object of the invention is to mitigate or obviate to some degree one or more problems associated with systems for suggesting candidate words as potential replacements for an inputted character string.

The above object is met by the combination of features of the main claims; the sub-claims disclose further advantageous embodiments of the invention.

Another object of the invention is to mitigate or obviate to some degree one or more problems associated with applicant's prior disclosed system.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a computer implemented method for suggesting one or more candidate words from a list of words based on an input string received at an electronic device, said method comprising the steps of: a) providing an array in memory for receiving edit distance values between initial substrings of the input string and initial substrings of each word in a set of some or all of the words in the list of words; b) applying an edit distance algorithm comparing a selected word to a received input string in order to obtain the aforementioned edit distance values; and c) for one or more words of the set of words, determining a number of characters K by which it overlaps with a prefix of a previously considered word and retaining edit distance values in said memory array for said word being considered using some or all of the edit distance values for the K prefix characters of the previously considered word. Preferably, step b) is applied to the empty word or string "", i.e. the word or string comprising no characters. The array may be provided in cache memory as it is small enough to fit within a typical cache memory in an electronic device. Preferably, only a single array is provided in memory for receiving edit distance values. The edit distance values for a word may be provided in the form of an edit distance table. The step of retaining edit distance values in said memory array for said word being considered may comprise retaining the already existing edit distance values from the first K+1 rows or columns of the edit distance table for the previously considered word in the edit distance table of the word being considered. The edit distance values of the first K+1 rows or columns do not need to be recomputed as they remain unchanged from the table for the previously considered word to the table for the word now being considered. This is because the table for the word being considered is prepared in the array using the table for the previously considered word. In the method, step b) may be applied to a number of words in the set of words where said words are spaced apart in the ordered list. In the method, step b) is preferably applied to the empty word. In the method, step c) is preferably applied to each word in the set of words. However, it should be understood that the method can be applied to the words in the set of words in any order, although there are advantages in considering the words in a specified order. In one embodiment, the words may be considered in a reverse order, but again this is not essential to the implementation of the method.

In a second main aspect, the invention provides an electronic device for suggesting one or more candidate words from a list of words based on an input string received at said electronic device, the device comprising: a memory storing machine readable instructions; and a processor configured to execute said machine readable instructions to implement the steps of the method according to the first main aspect of the invention. The electronic device is preferably a mobile electronic device, but may comprise a personal computer (PC) such as a desktop computer.

In a third main aspect, the invention provides a system for suggesting one or more candidate words from a list of words based on an input string received at an electronic device, the system comprising: a server having a memory storing machine readable instructions and a processor configured to execute said machine readable instructions; and an electronic device having a memory storing machine readable instructions and a processor configured to execute said machine readable instructions; the server and the electronic device being configured to communicate with each other over a network; wherein, in response to a request sent by the electronic device to the server based on a received string at the device, the server implements the steps of the method according to the first main aspect of the invention.

In a fourth main aspect, the invention provides a computer readable medium storing machine readable instructions executable by a processor of an electronic device for implementing the steps of the method according to the first main aspect of the invention.

In a fifth main aspect, the invention provides a computer readable medium storing machine readable instructions executable by a processor of a server for implementing the steps of the method according to the first main aspect of the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which:

FIG. 3 is a diagram of an example of a user device used in the system of FIG. 2;
FIGS. 4a to 4c comprise a series of edit distance tables illustrating the method of the invention.

DESCRIPTION OF PREFERRED EMBODIMENTS

Figures 1, 2:
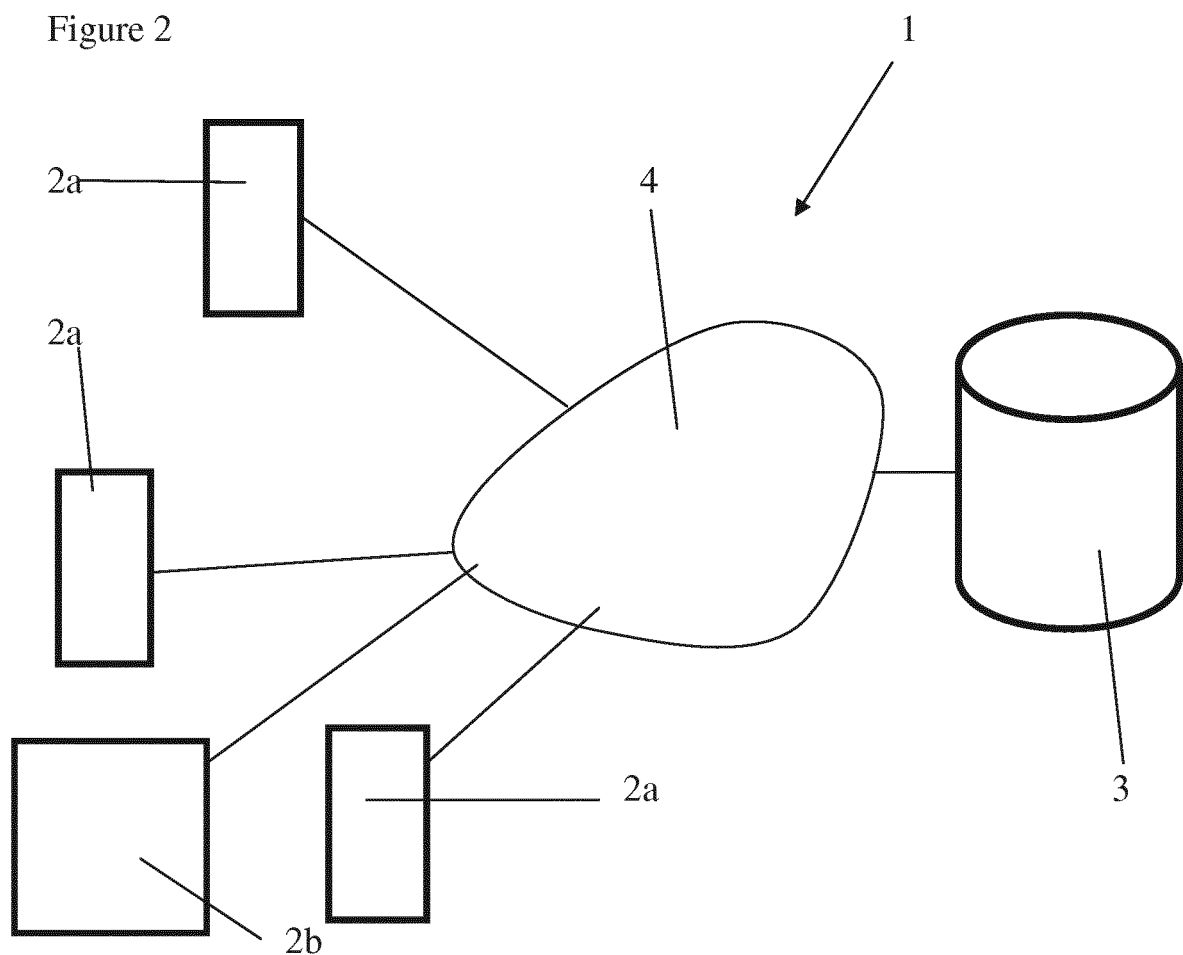
FIG. 1 shows an example of an edit distance table.
FIG. 2 is a diagram of an example of a system according to the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the figures, may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

A standard measure of the closeness of a received input string, e.g. a word to a target word is given by any member of a family of 'edit distances'. A well-known example is the Levenshtein distance between the two, which counts the minimum number of character insertions, deletions and substitutions (collectively, operations) necessary to transform the former into the latter. A variant includes the operation of transposition of two adjacent characters.

Another variant involves the introduction of weights into the Levenshtein distance; each of insertion, deletion, substitution and (if applicable) transposition is assigned a 'weight' or 'cost', and the weighted edit distance is defined as the minimal total cost of a sequence of operations which performs the appropriate transformation. A sub-variant of this variant allows the cost of a substitution to depend on the character being substituted and the character being substituted for. For example, when attempting to correct errors produced by a user typing on a standard keyboard, one might assign a lower cost to substitutions involving characters which are nearby on the keyboard. All of the above variants yield edit distance values which are better measures of similarity in many applications, including the prediction of user input.

One conventional method for computing an edit distance between two strings is the Wagner-Fischer algorithm. This algorithm can be adapted to handle any of the variants mentioned above. In essence, the Wagner-Fischer algorithm consists in the construction of a table which contains the edit distances from every initial substring of the first string to every initial substring of the second string. An initial substring is one that completely matches the beginning of the original string—so 'here' is a substring of 'there', but not an initial substring. 'the' by contrast is an initial substring of 'there' as is 'there' itself. The empty string "" comprises an initial substring of all strings.

Referring to FIG. 1, shown is an example edit distance table for two strings which may be considered as comprising a received input string and a target or intended input string. It is worth noting that, whilst reference is made herein to mistyped input strings, it should not be assumed that such mistyped input strings comprise spelling, syntax or grammatical errors. They may, on their face, appear to be correct inputs, but, in use, may comprise incorrect or erroneous inputs for the intended application or process to which they are being inputted.

In FIG. 1, the table illustrates the computation of an unweighted Levenshtein distance (with transpositions) from an original string "an act" to a target string "a cat". The table of FIG. 1 is found in the publication "Computing in the Age of Scarcity by James M. Jensen II" which can be accessed at http://scarcitycomputing.blogspot.co.uk/2013/04/damerau-levenshtein-edit-distance.html. The cell marked 20 provides the distance from "an" to "a" taking into account spaces in the strings, and is equal to 1 because the transformation can be performed by deleting a single character, namely 'n'. The cell marked 30 provides the distance from "an ac" to "a ca" and is equal to 2 because the transformation can be performed by deleting 'n' and transposing 'ac' to 'ca'. The cell marked 40 provides the distance from "an act" to "a cat", i.e. the actual edit distance required in this instance, and is equal to 2 because the transformation can be performed by deleting 'n' and transposing 'ac' to 'ca'. The value in the bottom right hand cell 40 therefore comprises the edit distance measure or value of the closeness of the input string to the target string.

It is noted that, in such edit distance tables, the top row will always contain the values, 0, 1, 2, . . . in order because the only way to turn an initial substring of the original string of length k into the empty string "" (which is the initial substring of the target string of length 0) is by performing k deletions. In a weighted case, where a deletion has cost d, the top row would contain 0, d, 2d, 3d, . . . in order. Similarly the leftmost column will always contain the values, 0, 1, 2, . . . in order, as the only way to turn "" into a substring of length k is by performing k insertions. In a weighted case, where an insertion has cost i, the leftmost column would contain 0, i, 2i, 3i, . . . in order.

In the general weighted case, if d(r, c) is denoted as the edit distance from an initial substring of the original string of length r into an initial substring of the target string of length c, it follows that:

d(0, c)=ci, where i is the insertion cost.
d(r, 0)=rd, where d is the deletion cost In the case without transpositions, all other cells can be computed using the following formula $$d(r, c) = \min(\\ \quad d + d(r-1, c), \text{<--- deletion}\\ \quad d(r, c-1) + i, \text{<--- insertion}\\ \quad d(r-1, c-1) + s[r-1, c-1] \text{<--- substitution}\\ )$$

where s[r-1,c-1] is the cost of substituting the $c^{th}$ target character for the $r^{th}$ original character. Note that this must be '0' if the characters are equal, to ensure that the edit distance from a string to itself is also 0, which is a generally desired property. Each of the three expressions inside this 'min' corresponds to one of the operations which can be used to derive the edit distance. For example, the first expression d+d(r-1, c) refers to the method of transforming the original string into the target string by:

a) deleting the final character and then
b) replacing the resulting string, which is the initial substring of the original string of length r-1, by the target string (which has length c).

Thus the values of all cells in the table are computed based on the values of cells above and/or to the left of them. The Wagner-Fischer algorithm simply consists of the computation of the values for all cells in order from top to bottom, left to right. The bottom right entry in the table gives the actual edit distance value required.

The present invention, however, is concerned not with simply finding the edit distance between two strings, but with the problem of finding candidate words in a fixed dictionary which have low edit distance from a received input string.

A conventional way of computing this involves iteration over every word in the dictionary. For each dictionary word, the edit distance between the received input string and the dictionary word is computed using, for example, the Wagner-Fischer algorithm. Those dictionary words which have lowest edit distance from the received input string are selected as the candidate words.

The underlying assumption of this conventional method is that it is necessary to consider each word in the dictionary in turn in comparison to the received input string hut, in a dictionary of say 30,000 to 80,000 words, it is not practical to go through the entire dictionary for each misspelling, considering every word as a possible candidate.

An alternative to or improvement upon the conventional method comprises the 'Fast and Easy Levenshtein distance using a Trie'. This improved approach constructs a data structure, called a trie, in which common prefixes of two or more words are explicitly represented by a single node. It then traverses the structure recursively, using the trie structure to ensure that, when two words share a common prefix, the relevant table rows are computed exactly once. There are, however, considerable technical difficulties with this approach. In particular, the trie consumes a huge amount of memory—so much so that it may not even fit in the 2 GB to 4 GB limit imposed by a 32-bit operating system.

Utilization of this much memory is clearly undesirable, and, in fact, not even feasible on many handheld or mobile electronic devices. It also results in a drawback that may not be immediately apparent. On modern computers, the time taken to fetch a value from memory vastly exceeds the time a processor takes to do primitive computations. This effect is mitigated by having a very small amount of memory which is rapidly accessible, called a 'cache'. The system heuristically attempts to preload relevant data from the main memory into the cache before said data are requested by a processor. Cases where this fails result in a massive slowdown. In fact, this picture is a slight over-simplification in that processors typically have two or three levels of 'cache', with the fastest levels having the smallest memory capacity. The smallest caches typically have a size of around 32 kB, and the largest are around 8 MB on a PC and 1 MB on a tablet computer or the like.

There are two situations in which cache misses can reliably be avoided. The first is where all of the data that needs to be considered fits into a cache; the smaller the cache utilized, the faster the program will be. The second situation is where, although a large amount of data is being accessed, said data are being accessed sequentially; because this access pattern is so common and so predictable, systems are typically very good at recognizing it and preloading data into the cache before it is requested by a processor.

In the case of the trie data structure, the fact that it may not even fit in the 2 to 4 GB limit makes it very clear that it will not fit into a cache in its entirety. Furthermore, the trie data structure is built up out of many nodes, which will in general be located far apart from each other in memory. As a system traverses the trie, it will typically jump from one node to another in a memory access pattern that is very far from sequential. The result of this will be a significant number of expensive, i.e. slow, cache misses.

A second major drawback with the improved method outlined above is that it 'allocates' (from memory) a fresh row of the table every time it reaches a new node of the trie. Memory allocation, and the implicit or explicit de-allocation that must be associated with it, are slow operations in the context of the algorithms being considered. Furthermore, memory allocation typically gives no guarantees about where allocated objects reside in memory, so that in the trie-based approach, table rows may be widely separated in memory. This will further degrade cache performance, i.e. result in a higher proportion of cache misses.

A third drawback is that the trie data structure requires a large amount of time to construct, which will result in slow application start-up, which is undesirable for many systems, particularly handheld systems or devices used on the move.

A fourth drawback is that the trie-based approach uses recursion of a form which is not amenable to tail-call optimization. This is known to carry significant time and space overheads.

Even in other modifications of the improved conventional method which have a lower memory usage, the memory usage is still high, and, in most cases, the data structure constructed will not fit into the cache in its entirety. Parts of the data structure are separately allocated and thus widely scattered in memory, so that memory access will not be sequential. Thus the approach will yield a large number of cache misses. The problems resulting from the separate allocation of table rows are also unchanged under this approach. And the problems relating to slow start-up and recursion also persist.

The present invention proposed a new solution to the foregoing problems which allows the method to be implemented wholly on an electronic device such as a mobile or handheld electronic device or a desktop PC in a fast and computationally efficient manner.

Figures 3, 4A:
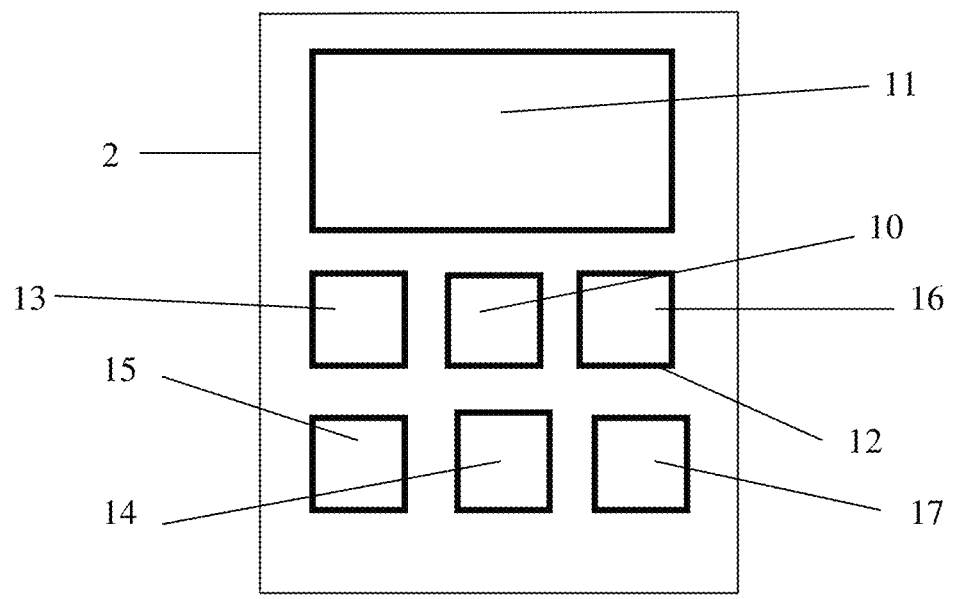

Referring again to the figures and, in particular to FIGS. 2 and 3, the system 1 of the invention comprises a number of user devices 2 and a central server 3. The user devices 2 comprise handheld and/or mobile electronic devices such as smart phones, tablet computers or the like 2a and/or personal computers (PCs) 2b. Each of the user devices 2 is capable of communicating with the central server 3 through a network such as the Internet 4, although this is not essential where the method of the invention is wholly carried out in the electronic device 2a or PC 2b. In such a case the electronic device 2 need not be connected to a network. Although, for clarity, only three electronic devices 2a and a single PC 2b are shown in FIG. 1, it will be understood that in practice the system 1 may comprise a large number of electronic devices 2, although this is again not essential as the method of the invention may be implemented on a single electronic processing device 2.

FIG. 2 illustrates an example of an electronic device 2a of the system 1 in more detail. As shown in FIG. 2, an electronic device 2a includes a data processor 10, a visual display 11, a user interface 12 allowing user instructions to be input to the device 2a and information to be presented and/or displayed to the user, a speaker 13 and a microphone 14. The various components of the electronic device 2a operate under the control of the processor 10 running machine code stored in the memory. The memory also includes cache memory. The user interface 12 may be integrated with the visual display as a touch screen display. In other examples the user interface 12 may be a dedicated keypad separate from the visual display. Electronic devices including these components are well known to the skilled person, so these need not be described in detail here. It will be understood that user PCs 2b will have similar functionalities.

Further, the electronic device 2a may comprise a location determining means 15, a mapping or navigation module 16, and a location identifying module 11. The navigation module 16 and location identifying module 17 are arranged to receive position information from the location determining means 15. In the illustrated example the location determining means 15 is a global positioning system such as the so-called GPS. In other examples different satellite based navigation systems may be used. The navigation module 16 and the location identifying module 17 may comprise dedicated hardware, or may comprise software programs or applications running on a processor 10 of the electronic device 2a. In some examples a user PC 2b may not comprise a location determining means 15. In some examples a user PC 2b which does not comprise a location determining means may still have access to location information from a separate location determining means such as the location determining means in the electronic device 2a.

The location identifying module 17 uses the position information provided by the location determining means 15 to provide location based services to a user.

Generally speaking, the electronic device 2a or PC 2b is configured in one embodiment to determine geographical coordinates for a location of the device itself or a location selected by a user on the mapping or navigation module 16. These numerical coordinates can then be resolved to a word based unique location identifier on the electronic device 2a or PC 2b itself or with the assistance of the server 3 in a manner as disclosed in applicant's International (PCT) patent application number PCT/GB2014/051152 or any other suitable such system.

The method disclosed herein is not however limited to word based geographical location identifiers, but could be employed with respect to any input character string in a device or system having a dictionary or data store of acceptable words. In the context of the invention, the term 'word' is not to be taken as comprising only a natural language word, but may comprise any inputted string of characters, alphabetic, numeric or otherwise, which comprises or matches a 'word', e.g. an acceptable or predefined character string entry in a dictionary or data store of the device or system, or is intended to comprise or match any such word entry in the dictionary or data store.

In the same or another embodiment, the electronic device 2a or PC 2b by itself or in communication with the server 3 is configured to resolve a received character input string, which is preferably a multi-word character string, to an associated aspect such as a set of geographical location coordinates. In some non-location based embodiments, the received character input string is resolved to an associated aspect such as a search query or a product identifier, e.g. a barcode number or the like.

More specifically and as will be more apparent from the following description, the method of the invention comprises a computer implemented method for suggesting one or more candidate words from a list of words based on an input string received at an electronic device 2. The method comprises: a) providing an array in memory for receiving edit distance values between initial substrings of the input string and initial substrings of each word in a set of some or all of the words in the list of words; b) applying an edit distance algorithm comparing a selected word, which may or may not be in the set of words and may or may not be an empty word (consisting of zero characters) to a received input string in order to obtain the aforementioned edit distance values; and c) for one or more words of the set of words, determining a number of characters K by which it overlaps with a prefix of a previously considered word and retaining edit distance values in said memory array for said word being considered using some or all of the edit distance values for the K prefix characters of the previously considered word. Step b) may be applied to the empty word or string "" having no characters as this enables the computation of the edit distance values to be initialised. The array may be provided in cache memory as it is small enough to fit within a typical cache memory in an electronic device. Preferably, only a single array is provided in memory for receiving edit distance values. The edit distance values for a word may be provided in the form of an edit distance table. The step of retaining edit distance values in said memory array for said word being considered may comprise retaining the already existing edit distance values from the first K+1 rows or columns of the edit distance table for the previously considered word in the edit distance table of the word being considered. The edit distance values of the first K+1 rows or columns do not need to be recomputed as they remain unchanged. Preferably, the list of words comprises an ordered list of words arranged to increase or optimise the amount of overlap between each word in the list and its preceding word. In the method, step b) may be applied to a number of words in the set of words where said words are spaced apart in the ordered list. In the method, step b) may be applied to the first word of the selected set of words which occurs earliest in the ordered list of words. In the method, step c) is preferably applied to each word in the set of words in order. It is not essential to the implementation of the method that the words are considered in any specified order, although this provides advantages. The words may be considered in any order including an arbitrary order.

In the following description, reference will be made to a 'word' or to the 'wordlist', but it will be understood that the term 'word' in this context could comprise any received input string to an electronic device, and 'wordlist' to any list of words. In a first, once only, preferably off-line step, the wordlist is sorted or ordered alphabetically and/or numerically and/or by some predefined ordering scheme. The purpose of ordering is to improve, i.e. increase, as much as possible the average amount of overlap between each word in the list and the next; that is, after sorting, each word in the list will very strongly tend to share a long prefix with the word or words immediately before it.

As reordering the wordlist is preferably done off-line, and thus only needs to be done once; any instantiation of a program embodying the method of the invention is preferably distributed with an ordered wordlist rather than an unsorted wordlist. In the case that the wordlist is as yet not ordered for some applications, the positions of the words in the original unsorted wordlist may remain of interest or use. In this case, each word in the unsorted list may be tagged with the number or another identifier indicative of its position before sorting is performed and the ordered numbers listed with their indications of original position.

In order to process edit distance values preferably provided in the form of edit distance tables for a set of some or all of the words in the wordlist for a received input string, there is provided a single array in memory for storing all of the tables required to compute edit distances for each of the set of words. An unexpected benefit of the invention is that the single array is small enough to be accommodated within a cache memory.

For each word of the set of words, an edit distance algorithm such as the Wagner-Fischer algorithm is applied to construct the relevant edit distance table. This preferably includes the step that, if not considering the first word in the set of words, e.g. the first word in the wordlist, a determination is made of the maximum number of characters K by which the word from the wordlist being processed overlaps with the previously considered word. For example, taking the word 'cheating', and having just considered the word 'cheater', then K will be 5. It is a feature of the edit distance algorithm that the first K+1 rows of the edit distance tables are the same for the word under consideration and the previously considered word. Consequently, the strings 'cheating' and 'cheater' have the same first 6 rows in their edit distance tables. Given that the edit distance table for the previously considered word has been computed, the first K+1 rows of its edit distance table already contain the correct values for K+1 rows of the edit distance table for the current word. As a result, the method can skip the computation of the K+1 rows for the current word by retaining the edit distance values of the first K+1 rows for the previously considered word. It will be understood that the arrangement of the edit distance tables may be such that the method above applies to columns of the tables rather than rows, it being merely a convention to refer to the edit distance values being arranged in rows.

Also, given that the wordlist is preferably ordered, e.g. ordered alphabetically and/or numerically and/or by any other suitable ordering scheme, this results in a large overlap between each word and its predecessor. Consequently, because computing the extent of the overlap is very fast compared to re-computing the skipped table rows, this modification will save a large proportion of the time when applying the edit distance algorithm.

The method of the invention preferably uses a single pre-allocated array to represent the tables in the Wagner-Fischer procedure with the same single array being reused for each word in the dictionary being considered. The two dimensions of the array are preferably chosen to exceed respectively a) a length of an expected or permitted input string and b) a length of the longest word in the dictionary. This array is significantly smaller than the smallest cache found in most modern computing systems and devices, and so access to it will involve minimal cache misses due to table access. Depending on the exact implementation parameters, the array can take up 1 kB or less. In fact, because the array fits in the smallest cache, access to it will be extremely fast. Furthermore, as described above, reusing a single array together with a very specific optimisation results in an algorithm which is much faster than the native algorithm even when cache effects are not considered. In fact, no memory is allocated or de-allocated during the procedure with the result that both the direct costs of allocation and de-allocation and the indirect costs due to increased cache misses are avoided.

The wordlist is preferably used in its natural format, i.e. as an array of words. Thus, there is no slowdown due to the need to construct a data structure. Further, the wordlist is preferably accessed strictly sequentially; that is, one accesses the first word and then the second word and so on. If the wordlist itself is sensibly allocated, this will result in minimal cache misses due to wordlist access.

Since the tables in the Wagner-Fischer procedure are stored using minimal space, and the wordlist is accessed in its natural format, the method of the invention described herein has virtually no space overhead.

The method makes no use of recursion and so avoids the associated time and space overheads.

When applying the method of the invention to specific applications such as that disclosed in applicant's prior patent application, there may be different schemes applied for suggesting candidate words as potential replacements of a received input string. One such scheme may be to find all dictionary words within a given edit distance threshold of the received input string or to find the M number of words which are closest to the received input string in terms of edit distance. These can be considered as early termination optimisation processes.

In the latter case, a standard data structure such as a priority queue may be used to store only the M best words together with their edit distances, as opposed to storing the edit distances for each word, and then determining the M best words at the end. As M is known in advance, space for the priority queue can be pre-allocated to avoid allocation during the edit distance computation process. Preferably, the priority queue is initialized with 'sentinel' words with selected high edit distances to simplify the main loop. These sentinels will always be displaced by the first M words considered, and so will never be present in the final output.

In the case of finding words within a given edit distance, the edit distance table computation is preferably terminated for a word as soon as every entry in a given row of its edit distance table is determined to be greater than a threshold and, if transpositions are considered, every entry in the previous row plus the cost of transposition is greater than the threshold. In this situation, however the rest of the computation may proceed, although the result will not be viable to suggest a candidate word.

In the M-word case, the largest edit distances of the M best words is tracked, preferably continuously, and the use of the priority queue data structure makes it relatively easy to do this. The continually updated value is preferably used as a cutoff exactly as in the case of using a threshold to optimize processing. In both cases, the smallest value in each row in an array is tracked to avoid re-computing this when the re-computation of rows is skipped as hereinbefore described.

The early termination optimisation processes which can be applied separately or in combination are particularly effective because they create a synergistic effect with the main edit distance computation process. The main edit distance process enables the skipping of the computations of prefixes of words whilst the early termination optimizations allow consideration of a word to be concluded as soon as enough characters have been seen to ensure that it is not a viable candidate. In other words, these optimizations enable processing of the complications of the ends of words to be skipped. Together, the main edit distance process and the early termination process(es) enable only a small segment in the middle of each subsequent word to be considered which results in a computationally efficient and fast process.

For example, consider the case where the main edit distance process enables the first 40% of a word to be skipped (through copying the K+1 rows of its predecessor's edit distance table) and one or both of the early termination processes enables the last 40% of a word to be skipped. The main process or early termination process(es) reduce processing time to 60% of the original running time (assuming no significant overheads). If the two processes were independent, it would be expected that the running time would reduce to 36% of the original running time. However, because the two processes complement each other and it is only necessary to consider 20% of each word, this would reduce the running time to about 20% of the original running time.

Preferably, the overlap between each word and the next in the ordered wordlist is pre-computed and stored. The cost in space is small relative to the wordlist itself, and this results in an appreciable improvement in the speed of processing.

In some applications, if one or more of the 'early termination' optimisations is being applied, the rows which are sufficient to determine that a word is not viable will be shared with a large number of subsequent words. In this case it is preferable to avoid considering these words one by one. More specifically, in the case where the first K+1 rows of a word's edit distance table are sufficient to see that the word will not be a viable candidate for the received input string, it is possible to then skip all subsequent words which have an overlap of K or more characters with their predecessor. To do this efficiently, the overlap information is augmented by having each word point to the next word in the list with a shorter overlap to its predecessor. Following the chain of pointers is guaranteed to rapidly skip all non-viable words.

Preferably also, as the first row and column of the table always contain the same values, the array can be initialized with these values at the start of the algorithm and never written to again. This also provides a significant speed-up, both directly and indirectly by reducing the amount of code in the time-critical region and so potentially improving branch prediction, etc.

Referring to FIGS. 4a to 4c, shown are a series of edit distance tables. Commencing with the input string 'abanden', merely by way of example, FIG. 4a shows the edit distance table for an initial step of the method of the invention. In this example, the input string is set horizontally across the top row of the table and the word to which the input string is compared to obtain the resulting edit distance values is placed vertically down the left side of the table, i.e. the leftmost column. The table is accommodated within the single array in memory. It will be understood that the table could be organised differently such that, for example, the input string is arranged vertically and the comparison word arranged horizontally. In FIG. 4a, the comparison word comprises the empty word, i.e. the no-character or empty string word. Also, in this example, only insertion, deletion or substitution of characters is permitted, each operation has a value or cost 1 and the word list starts with 'abacus', 'abandon', etc.

In the initial step, the edit distance values for the input string 'abanden' compared to the empty word are computed. This results in the table as shown in FIG. 4a where only the top row of the table contains edit distance values showing in this case the number of character insertions need to move from the empty word to the input string (or conversely the number of deletions need to move from the input string to the empty word). In this example, there is no significance to the size of the table except that it must be at least as wide as the input string and deeper than the comparison word. In practice, it will be bigger in both respects.

In FIG. 4a, the '?' entries in the table indicate values which will not need to be read from. Consequently, it is not necessary to even initialise these values in the table. The underlined value in the table, i.e. '7' in this example, comprises the edit distance from the input string 'abanden' to the empty word string.

Referring now to FIG. 4b, this comprises the edit distance value table for the comparison word 'abacus' from the word list. In this step of the method, the existing memory array containing the table of FIG. 4a is re-used to obtain the edit distance values for the input string 'abanden' compared to the word 'abacus'. Since the last word considered (the empty word string) and 'abacus' overlap by zero characters, then K=0, so K+1=1. Consequently, the first row of the table of FIG. 4a is retained as the first row of table FIG. 4b without any need to calculate the first row of the table of FIG. 4b, but the next six rows of the table of FIG. 4b do need to be calculated for this example. It will be understood that, in some embodiments of the method of the invention, it will be possible when calculating edit distance values for some of the next six rows of the table for 'abacus' to make a judgment or determination that this comparison word is not a viable candidate word for the malformed input string and to thereby terminate calculation of further edit distance values for this word, i.e. not completing the table.

In the table of FIG. 4b, the rightmost and lowermost edit distance value in the completed table, namely the underlined value '4', comprises the edit distance measure from the input string 'abanden' to the comparison word 'abacus'. This value for the result of the comparison of the input string 'abanden' to the comparison word 'abacus' can be stored in memory and employed in selecting by rank or score candidate words as suggested replacements for the input string.

FIG. 4c comprises an edit distance value table for a next word comparison in the method of the invention. In this example, the input string 'abanden' is compared to a next word 'abandon' in the word list. The table of FIG. 4b is re-used to obtain the edit distance values for this step. Since 'abacus', the last word considered, and the word 'abandon', the word now being considered against the input string, overlap by the three characters 'aba' then K=3 so K+1=4. Consequently, the first four rows of the table of FIG. 4b already contain the correct values for the first four rows of the table of FIG. 4c and thus the first four rows of the table of FIG. 4b are retained as the first four rows of the table of FIG. 4c, negating the need to calculate the values for said first four rows of the table of FIG. 4c. The remaining four rows of the table of FIG. 4c need to be calculated to complete the table with the rightmost and lowermost underlined entry '1' in the table comprising the edit distance measure from the input string 'abanden' to 'abandon'. The edit distance measure '1' obtained in the table of FIG. 4c compared to the edit distance measure obtained for the table of FIG. 4b indicates that the word 'abandon' is a better candidate word for replacing the input string 'abanden' than the comparison word 'abacus'.

The method of the invention would continue with the table of FIG. 4c acting as a starting point for obtaining the edit distance values for a next word in the word list and so on thereby negating the need at each step to compute the edit distance values for a substantial number of rows.

Whilst the initial step using the empty word string as the comparison word illustrated by FIG. 4a provides benefits, it is not an essential step. The method in this example could commence by computing the edit distance values for the comparison word 'abacus'. However, an advantage of using the initial step of FIG. 4a is that it makes initialisation of the edit distance table in the single array much simpler as the first row for any input string compared to the empty string comprises the series 0, 1, 2, 3, 4, 5 . . . S, where s is the length of the input string. Consequently, there is no need to actually calculate the distance values for the initial table of FIG. 4a or any initial table using this method.

It is also possible to reduce the number of computations per table in the following way: before any computations start, one enters into the leftmost column of the array the values 0, 1, 2, 3, 4, . . . h-1, where h is the height of the array. As these values are valid for all tables, they may be retained through every subsequent calculation, so that it is never necessary to do any computations pertaining to the leftmost column of any table. This also has the benefit of reducing the number of edge-cases that the time-critical code needs to consider, and this in turn may result in further speedups.

The method is preferably based on an ordered list of comparison words, but this is not essential to the implementation of the method of the invention as the method does not necessitate the consideration of words from the word list in any specific order. However, ordering the words in the word list may increase the overlap between each word and the next to thereby increase the degree by which the table of a word can retain values from the table of a last considered word.

The method of the invention can be applied in the method disclosed in applicant's prior disclosed patent application to select potential candidate words as replacements or corrections of any one or more of the expected three word inputs for geographical location indicators as the system employs a 'dictionary' of 40,000 acceptable 'words'

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A computer implemented method for suggesting one or more candidate words from a list of words based on an input string received at an electronic device, said method comprising the steps of:
   a) providing an array in memory of said electronic device for receiving edit distance values between initial substrings of the input string and initial substrings of each word in the list of words;
   b) applying only a standard edit distance algorithm comparing a each word in the list of words to the received input string in order to compute the aforementioned edit distance values;
   c) modifying step b) by, for one or more words in the list of words, determining a number of characters K by which it overlaps with a prefix of a previously considered word and retaining edit distance values in said memory array for said word being considered using some or all of the edit distance values for the K prefix characters of the previously considered word;
   wherein step b) is terminated once a predetermined number of candidate words for a received input string is selected;
   the method further comprising the step of:
   d) inputting the predetermined number of candidate words for a received input string into a location identifying module of the electronic device, said location identifying module resolving the predetermined number of candidate words for a received input string to numerical location coordinates.

2. The method of claim 1, wherein the array is provided in cache memory.

3. The method of claim 1, wherein step b) is applied to an empty word or string comprising no characters or wherein step b) is applied to a number of words in the set of words where said words are spaced apart in the list.

4. The method of claim 1, wherein the list of words comprises an ordered list of words and step b) is applied to the first word in the ordered list of words.

5. The method of claim 1, wherein the edit distance values for a word are provided in the firm of an edit distance table and wherein the retaining step comprises retaining a first K+1 rows or columns of an edit distance table for a previously considered word as the first K+1 rows or columns of the edit distance table for a word being considered.

6. The method of claim 5, wherein, following step c), the method further comprises step d) of computing further rows of the standard edit distance table for each word in the list of words using. the edit distance algorithm.

7. The method of claim 1, wherein the method comprises providing only a single array in memory.

8. The method of claim 1, wherein the edit distance algorithm comprises the Wagner-Fischer algorithm.

9. The method of claim 5, further comprising the step of pre-allocating a first row and a first column of each edit distance table with standard values determined by the Wagner-Fischer algorithm.

10. The method of claim 1, further comprising the steps of, where the list of words is not yet ordered:
    associating with each word in the not yet ordered word list an indication of its original position within the not yet ordered wordlist; and
    re-arranging the words in the not yet ordered word list into an ordered list of words with their associated indications of their original positions within the not yet ordered word list.

11. The method of claim 10, wherein, the step of re-arranging the order of the not yet ordered word list comprises arranging said words alphabetically and/or numerically andior by any ordering scheme suitable to increase or optimize a degree of overlap between each word in the list and its preceding word in the list.

12. The method of claim 1, wherein it comprises ordering the words of the list into an ordered list of words and a process of arranging the words of the word list into an ordered word list is conducted off-line and/or is conducted only once.

13. The method of claim 1, wherein a two-dimensional size of the array provided in memory has a first dimension of greater or equal to an expected received input string or permissible input string and a second dimension of greater or equal to a length of a longest word in the word list.

14. The method of claim 5, wherein the step of computing an edit distance table tbr a word is terminated once it is determined that every entry in a given row of the edit distance table for that word is greater than a threshold.

15. The method of claim 5, wherein the step of computing an edit distance table for a word is terminated once a predetermined number of candidate words for a received input string is selected.

16. The method of claim 15, wherein the predetermined number of candidate words for a received input string is selected h using a priority queue data structure optionally implemented on a binary heap.

17. The method of claim 1, wherein the list of words comprises an ordered list of words in which a word in the list has associated with it a character overlap information pointer pointing to a subsequent word in the list having a shorter character overlap with said word than any further words following said word but preceding said subsequent word.

18. The method of claim 1, wherein each word in the list of ordered words has a character overlap information pointer associated with it.

19. The method of claim 18, wherein the method comprises following a chain of character overlap information pointers in the ordered list of words to skip words deemed not viable candidate words.

20. The method of claim 1, wherein the method comprises initializing a first row and column of the edit distance array with standard values at the start of the standard edit distance algorithm and not writing values again to said first row and column whilst the standard edit distance algorithm is running.

21. An electronic device for suggesting one or more candidate words from a list of words based on an input string received at said electronic device, the device comprising:

a memory storing machine readable instructions;
a processor configured to execute said machine readable instructions to implement he steps of the method:
a) providing, an array in memory of said electronic device for receiving edit distance values between initial substrings of the input string and initial substrings of each word in the list of words;
b) applying only a standard edit distance algorithm comparing each word in the list of words to the received input string in order to compute the aforementioned edit distance values; and
c) modifying step b), for one or more words in the list of words, determining a number of characters K by which it overlaps with a prefix of a previously considered word and retaining edit distance values in said memory array for said word being considered using some or all of the edit distance values for the K prefix characters of the previously considered word;
wherein step b) is terminated once a predetermined number of candidate words for a received input string is selected;
the processor being further configured to implement the step of:
d) inputting the predetermined number of candidate words for a received input string into a location identifying module of the electronic device, said location identifying module resolving the predetermined number of candidate words for a received input string to numerical location coordinates.

22. A non-transitory computer readable medium storing machine readable instructions executable by a processor of a server for implementing the steps of the method comprising:
a) providing an array in memory of said electronic device for receiving edit distance values between initial subsuings of the input string and initial substrings of each word in the list of words;
b) applying only a standard edit distance algorithm comparing each word in the list of words to a the received input string in order to compute the aforementioned edit distance values; and
c) modifying step b) by, for one or more words in the list of words, determining a number of characters K by which it overlaps with a prefix of a previously considered word and retaining edit distance values in said memory array for said word being considered using some or all of the edit distance values for the K prefix characters of the previously considered word;
wherein step b) is terminated once a predetermined number of candidate words for a received input string is selected;
the processor being further configured to implement the step of:
d) inputting the predetermined number of candidate words for a received input string into a location identifying module of the electronic device, said location identifying module resolving the predetermined number of candidate words for a received input string to numerical location coordinates.

* * * * *